United States Patent
Dieckmann

(10) Patent No.: US 6,459,093 B1
(45) Date of Patent: Oct. 1, 2002

(54) DYNAMIC LIGHT SCATTERING AT MULTIPLE DISCRETE WAVELENGTHS, USING MULTIPLE MONO-MODE FIBRES OR FOR DETECTING THE VELOCITY OF SCATTERING SENSORS

(75) Inventor: Matthias Wilhelm Dieckmann, Den Haag (NL)

(73) Assignee: European Space Agency, Paris (FR)

( * ) Notice: Subject to any disclaimer, the term of this patent is extended or adjusted under 35 U.S.C. 154(b) by 0 days.

(21) Appl. No.: 09/477,733

(22) Filed: Jan. 5, 2000

(30) Foreign Application Priority Data

Jan. 21, 1999 (EP) .............................. 99400139

(51) Int. Cl.⁷ .............................. G01N 15/06

(52) U.S. Cl. ................. 250/573; 250/227.19; 356/441

(58) Field of Search ................. 250/574, 573, 250/575, 578.1, 222.2, 225, 227.19; 356/28, 27, 28.5, 337, 338, 342, 343, 436, 441, 442

(56) References Cited

U.S. PATENT DOCUMENTS

| | | | |
|---|---|---|---|
| 3,768,908 A | 10/1973 | Zaromb | 356/103 |
| 4,686,371 A | 8/1987 | Birch et al. | 250/461.1 |
| 4,927,268 A | * 5/1990 | Carr et al. | 356/336 |
| 4,975,237 A | 12/1990 | Brown | 356/338 |
| 5,093,866 A | * 3/1992 | Douglas-Hamilton et al. | 382/6 |
| 5,155,549 A | 10/1992 | Dhadwal | 356/336 |
| 5,208,651 A | 5/1993 | Buican | 356/346 |
| 5,502,561 A | 3/1996 | Hutchins et al. | 356/336 |

OTHER PUBLICATIONS

The Journal of Chemical Physics, vol. 57, No. 11, Dec. 1, 1972, pp. 4814–4820, by Dennis E. Koppel.

Physical Review Letters, vol. 82, No. 1, Jan. 4, 1999, "Structure of Marginal and Fully Developed Collidal Liquids" by A. Moussaïd et al., pp. 225–228.

Applied Optics, May 20, 1993, vol. 32, No. 1, Lasers, Photonics, and Environmental Optics, Dynamic Light Scattering with Single Mode and Multimode Receivers, Jaroslav Ricka, pp. 2860–2875.

Dynamic Light Scattering, "The Method and Some Applications", edited by Wyn Brown, 1993: Chapter 16, "Diffusing–wave spectroscopy" by David A. Weitz and David J. Pine, pp. 652–720. (Month unknown).

Computer Physics Communications 27 (1982) 229–242, "Contin: A General Purpose Constrained Regularization Program for Inverting Noisy Linear Algebraic and Integral Equations" by Stephen W. Provencher, pp. 229–242. (Month Unknown).

(List continued on next page.)

Primary Examiner—Que T. Le
(74) Attorney, Agent, or Firm—Sughrue Mion, PLLC

(57) ABSTRACT

A dynamic light scattering apparatus comprises at least two lasers (11) of different wavelengths which illuminate the same volume (SV) of a fluid containing scattering or fluorescent centres. The scattered or fluoresced radiation is detected at each discrete wavelength and properties, such as the concentration of different particle sizes, of the volume (SV) are derived. The detection at multiple wavelengths allows the effects of multiple scattering to be overcome. Multiple volumes (SV) may be illuminated and detected simultaneously so as to measure the spatial variation of particle size concentration. The rotational diffusion constants of the particles may be measured from the depolarized component of scattered light.

17 Claims, 14 Drawing Sheets

OTHER PUBLICATIONS

Applied Optics, vol. 35, No. 24, "Circular–array Optical–fiber Probe for Backscattering Photon Correlation Spectroscopy Measurements", Massimo Brenci et al., Dec. 1, 1996, pp. 6675–6780.

Optical Engineering, May 1996, vol. 35, No. 5, pp. 457–465, "Combined Raman Lidar for Aerosol, Ozone, and Moisture Measurements", by Jens Reichardt.

ESA vol. 7, No. 1, Mar. 1997, "Preparing for the Future", pp. 6 & 7: "Photo Correlation and Scattering Techniques", by Dieckmann eta l.

Journal of Modern Optics, 1995, vol. 42, No. 9, 1929–192, "Two–colour Dynamic Light Scattering" by P.N. Segrèet al., pp. 1929–1952, (Month Unknown).

"An Integrated Fiber Optic System for Dynamic Light Scattering Measurements in Micorgravity" by Rafat R. Ansari, SPIE vol. 2210/211 Published 1994 Meeting Date: Apr. 17–Apr. 22, 1994.

* cited by examiner

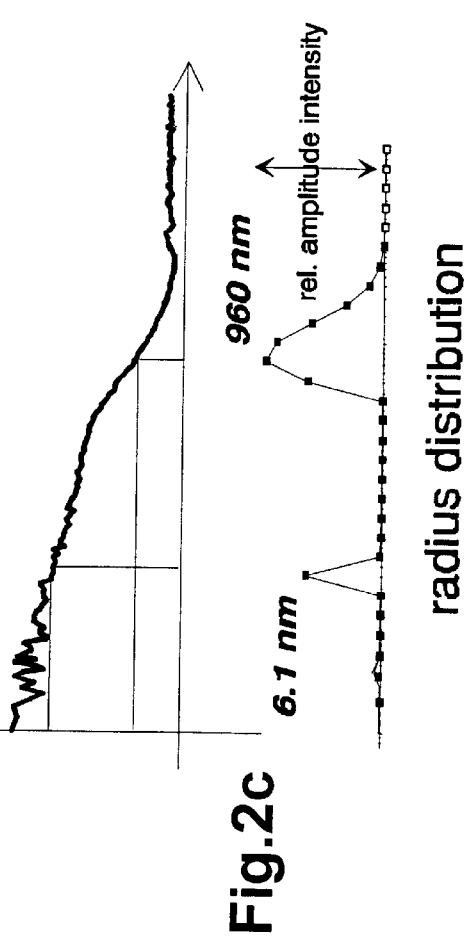
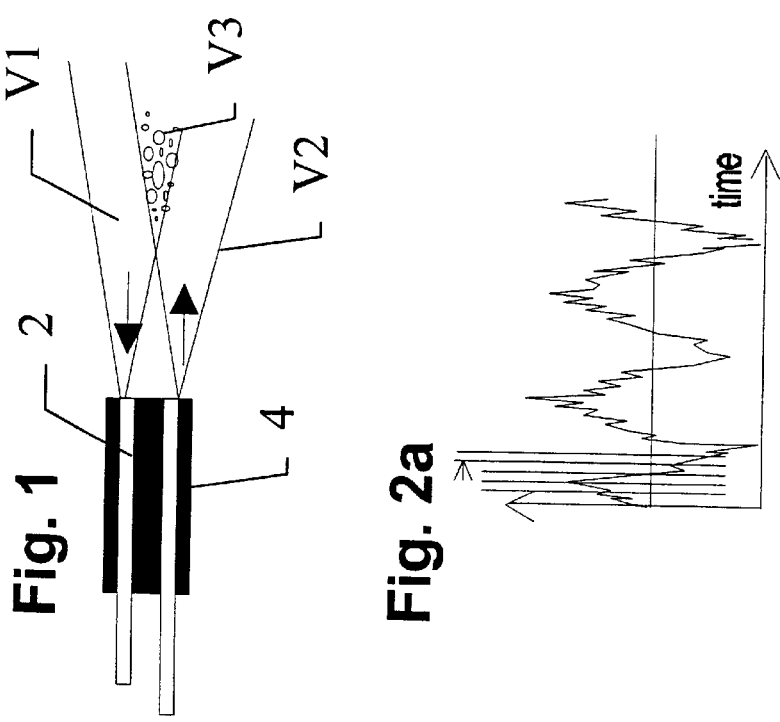

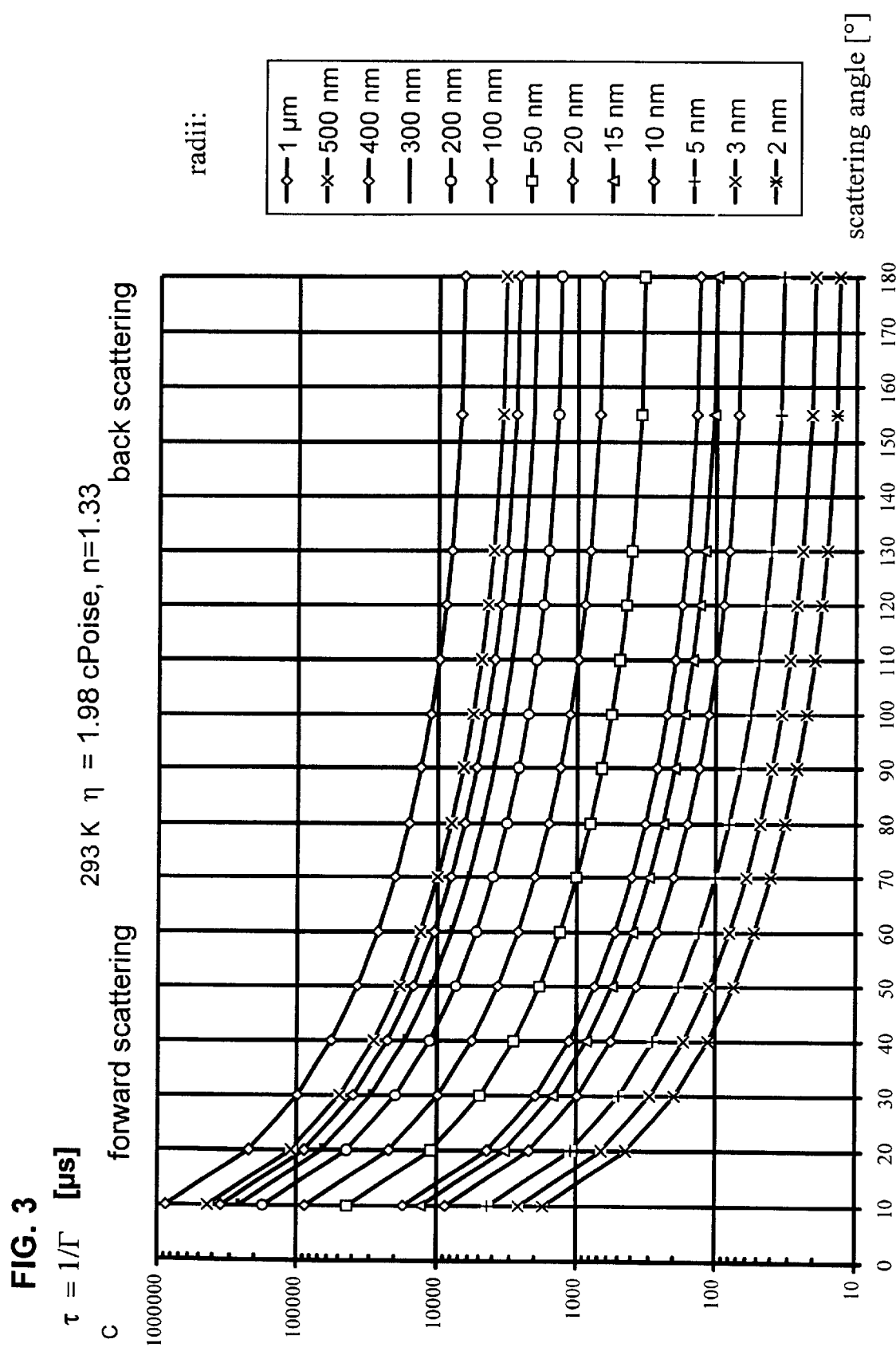

Velocity derived from ACF

DYNAMIC LIGHT SCATTERING AT MULTIPLE DISCRETE WAVELENGTHS, USING MULTIPLE MONO-MODE FIBRES OR FOR DETECTING THE VELOCITY OF SCATTERING SENSORS

INTRODUCTION

The present invention relates to a dynamic light scattering (DLS) or photon correlation spectroscopy (PCS) method and apparatus, particularly but not exclusively for Fluorescence Correlation Spectroscopy (FCS) or lidar applications.

PCS/DLS involve the illumination of a sample with coherent light. The intensity of photons scattered from the sample fluctuates as a result of the Brownian motion of scattering particles in the sample. The number of photons scattered in a narrow range of angles, defined by specific apertures and light propagating and focusing elements, is detected as a function of time and the resultant function is autocorrelated, preferably in real time. This allows the distribution of relaxation time constants and therefore the distribution of sizes of the scattering particles to be determined.

FCS involves the use of a similar technique on fluorescent samples, except that the photons emitted by fluorescence, instead of scattered photons, are detected as a function of time. The resultant function is autocorrelated in real time, in order to measure the specific change in binding of molecules, detect molecules present in low concentrations and determine related reaction rates.

DLS-Lidar involves the active remote sensing of a portion of the atmosphere by illuminating the portion with coherent light and detecting the intensity of photons scattered from that portion as a function of time. The resultant function is autocorrelated in real time, in order to derive the particle size distribution within the sampled portion of the atmosphere.

A problem associated with the above techniques is that, as the number per unit volume of scattering particles increases, there is an increased probability of multiple scattering in which a detected photon has been scattered by more than one particle, which means that the desired properties can no longer be measured directly. Furthermore, the range in velocity of Brownian motion becomes restricted because of collisions between scattering particles. In order to compensate for these effects, the normal practice is to detect the scattered photon intensity at a range of different scattering angles, typically from 10° to 180° (backscattering). As there is a quadratic dependence of time constants on scattering angle for the ideal case, any deviation from this quadratic function, due to multiple scattering or restricted particle collision, is quantifiable and can be compensated for. However, such procedures are time-consuming because of the number of readings that need to be taken, and require expensive goniometers.

In lidar applications, it is not practically feasible to perform angle-dependent scans of a portion of the atmosphere, so that the particle size distribution and degree of multiple scattering cannot readily be measured.

SUMMARY OF THE INVENTION

According to one aspect of the present invention, there is provided a dynamic light scattering apparatus and method in which a sample is illuminated by laser light of different wavelengths and the fluctuations in light scattered or fluoresced by the sample at each wavelength are detected. The time constants of particles in the sample are derived from the detected light fluctuations by auto-correlation or cross-correlation of the detected light intensity with respect to time. In one aspect, measurement of light scattering or fluorescence at different wavelengths is normalised to equivalent respective scattering angles, so as to give precise information on properties such as particle cross-sections or multiple scattering aspects. In another aspect, illumination at each wavelength takes place substantially along a first axis, and scattered radiation at each wavelength takes place along a second axis.

According to another aspect of the present invention, there is provided a method and apparatus for measuring the velocity of particles in a sample by means of dynamic light scattering, in which the frequency of oscillations in correlation functions of the detected intensity fluctuations as a function of time are measured and used to determine components of velocity in the direction of detection.

According to another aspect of the present invention there is provided a method and apparatus for the measurement of properties of particles in a section of atmosphere by means of dynamic light scattering, in which the section is illuminated with laser pulses and the pulses scattered from that section are detected and their intensity fluctuation correlated to determine the properties of the particles. Preferably, the intensity fluctuations of the detected pulses are concatenated and/or high-pass filtered prior to correlation. In this way, dynamic light scattering techniques may be applied to remote sensing of the atmosphere.

In an embodiment of the invention, a dynamic light scattering apparatus comprises discrete numbers of transmitting lasers with various wavelengths ranging from the visible to the near infrared. Each discrete laser transmitter forms a transmitter channel, which operates in conjunction with one or more receiver channels. The laser light propagates to the light scattering sample via apertures, focusing, telescope and/or fibre optical elements. By these elements, beam waists are produced in the sample. Corresponding to the channels of transmitting lasers are a second set of functionally identical elements, for collecting and receiving each wavelength of scattered light separately and simultaneously. The apertures, light collecting and propagating elements for one channel are adjusted in combination to produce an intercept of the dynamic part of the autocorrelation function close to unity.

The automated functions of the apparatus from one back scattering position replace the function of a goniometer for scattering angle scans. This is achieved by (quasi-) simultaneous, n-fold channel operation. The apparatus enables classification and quantification of multiple scattering sample systems, the normalisation of particle cross-sections, sizes and shapes to the wavelengths used and the quantification of repulsive forces exerted to particles or restricted particle collision as in a gel-like system with cage functions. If multiple scattering is encountered the apparatus allows adjustments to be selected to derive the true particle size. The simultaneous multiple volume, n-fold, acquisition capability of the apparatus applies to three general fields: particle sizing in the atmosphere by active remote sensing, particle sizing and visco-elastic property determination in fluids and suspensions as for example in crystal growth of bio molecules from solutions and property determination of light emitting samples by fluorescence recording as for example in immune assay developments. The apparatus utilises cross-correlation, depolarised and polychromatic dynamic light scattering in pulsed and continuous wave operation and filtering methods to derive appropriate autocorrelation functions.

BRIEF DESCRIPTION OF THE DRAWINGS

Specific embodiments of the present invention will now be described with reference to the accompanying drawings, in which:

FIG. 1 is a schematic diagram of the optical front end of one channel of an apparatus used to measure backscattering from suspended particles;

FIG. 2a shows an example of recorded intensity fluctuation as measured by the apparatus of FIG. 1;

FIG. 2b shows the autocorrelation function of the fluctuation of FIG. 2a;

FIG. 2c shows the particle radius distribution derived from FIG. 2b;

FIG. 3 shows the variation of time constants with scattering angle for different particle sizes in a sample of aqueous solution or fluid suspension with a given viscosity and refractive index;

DETAILED DESCRIPTION OF THE PREFERRED EMBODIMENTS

Figure 1A:
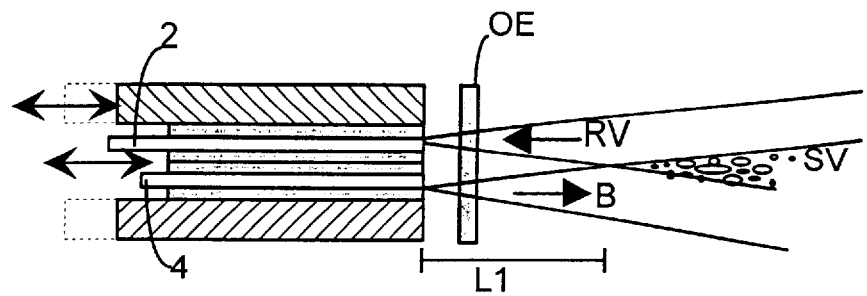
FIGS. 1a and 1b show alternative examples of the optical front end in FIG. 1.
Figure 1B:
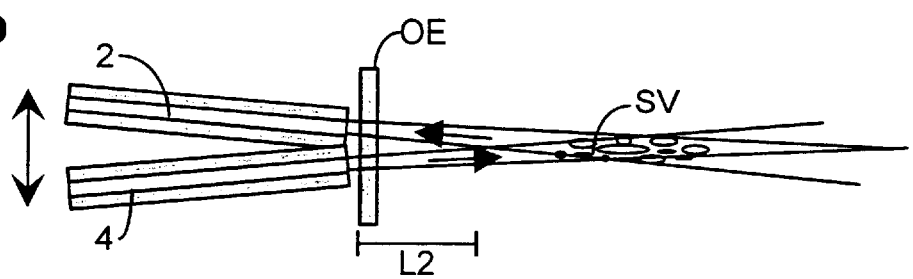

FIG. 1 shows in schematic form the optical front end of one channel (i.e. one transmitter and one receiver) of the apparatus consisting of a transmitting optical fibre or fibres 4 connected to a laser source and a receiving optical fibre or fibres 2 connected to a detector, such as a photo-multiplier tube or avalanche photo-diode, mounted together so that the axes of their ends are parallel (as in FIG. 1a) or at a defined angle (as in FIG. 1b) to each other. Laser light emitted by the transmitting optical fibre(s) 4 diverges over a beam B while the receiving optical fibre(s) 2 collects light emitted from a reception volume RV. In a scattering volume SV which is the intersection of the illuminating beam B and the reception volume RV, particles scatter the laser light in different directions and the receiving optical fibre(s) 2 collects light scattered within a narrow range of directions.

As shown in FIGS. 1a and 1b, the defined angles between the transmitting fibre(s) 4 and the receiving fibre(s) 2 are adjusted by movement of tight-fitting coaxial micro-positioning stages (MPS) in the reciprocating direction shown by double arrows, so as to locate the scattering volume SV at distances L1 and L2 in FIGS. 1a and 1b respectively, and to compensate for the effect of Snell's law on different wavelengths when co-locating the beam waists of different wavelengths. Additional beam forming is produced by suitable optical elements (OE) such as lenses, prisms, wavelength filters, holographic elements and/or telescopes, according to the specific application. The optical elements OE may produce a hollow transmitter beam, focussed on the scattering volume or volumes SV.

The receiving and transmitting optical fibres 2 and 4 are selected as either mono-mode or few-mode (i.e. more than one but preferably less than about two modes) fibres and may either receive and transmit through the same optical elements or have different optical elements. Different possible combinations will now be discussed with reference to FIG. 1c.

In arrangement I, the transmitting fibre 4 comprises a single mono-mode fibre and the receiving fibre 2 comprises a single few-mode fibre (shown as option Ia), or the transmitting fibre 4 comprises a single few-mode fibre and the receiving fibre 2 comprises a single mono-mode fibre (shown as option Ib); in either case, the transmitting and receiving fibres share the same optical elements.

Figure 10:
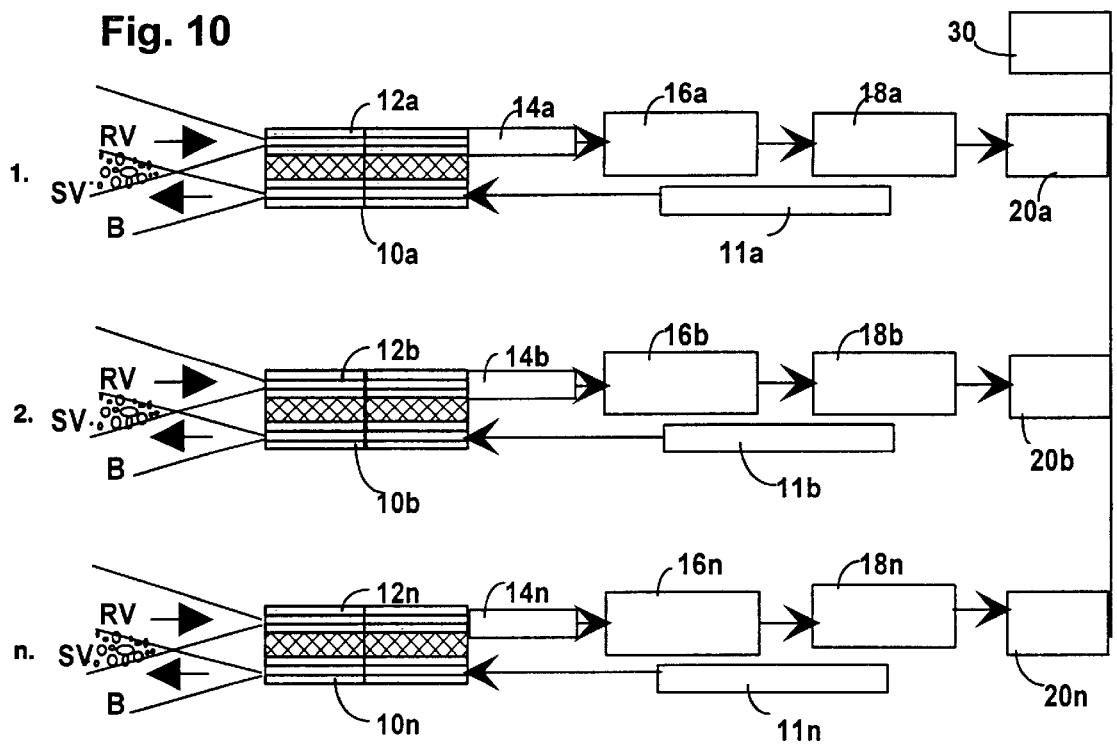
FIG. 10 shows a generalised embodiment of the present invention for the measurement of a sample.

In arrangement II, the transmitting fibre 4 and the receiving fibre 2 have separate sets of optical elements. In option a (indicated by the reference IIa in FIG. 1c), the receiving fibre 2 is a few-mode fibre and the transmitting fibre 4 is a mono-mode fibre, as in arrangement Ia, while in option b (indicated by the reference IIb in FIG. 1c), the transmitting fibre 4 is a few-mode fibre while the receiving fibre 2 is a mono-mode fibre, as in arrangement Ib. The embodiment of FIG. 1c can be implemented alternatively as shown in FIG. 10, so that an n-fold combination of channels results.

In arrangement III, the transmitting fibre(s) 4 and the receiving fibre(s) 2 have separate sets of optical elements. The transmitting fibre 4 is a single mono-mode fibre, while the receiving fibres 2 comprise at least two mono-mode fibres in parallel, each having a separate detector, discriminator and pulse former. Preferably, the receiving fibres 2 are arranged in pairs of fibres arranged to receive the same wavelength, with the outputs of each pair then being cross-correlated. This cross-correlating arrangement eliminates detector dead-times, after-pulsing and dark counts and will be described in more detail with reference to FIG. 10b.

The detector outputs a current proportional to the rate of photons received by a receiving fibre 2, which current varies with time as shown for example in FIG. 2a. The current is converted to a digital value by an A/D converter connected to a computer, which stores a set of digital values as a function of time. Alternatively, individual received photons are counted by means for example of a photomultiplier tube, a discriminator for setting a threshold for the signal of a detected photon, a pulse former for generating a pulse when the photon is detected, a counter for counting the generated pulses within a repeating period and a storage device for storing the count values for each period. The computer performs an autocorrelation function on the stored values as follows:

$$ACF(\tau) = \sum^{t} I(t)I(t+\tau) \tag{1}$$

where I(t) is the fluctuating received light intensity as a function of time t, such that $\overline{I(t)}$ equals the average scattered intensity over the integration time, and τ is the sampling interval, which forms quasi-logarithmic channels in the structures of the correlator. A sample autocorrelation function is shown in FIG. 2b.

The ACF function is related to the particle sizes by the following equations:

$$ACF(\tau) = g^{(2)} = 1 + \beta \cdot e^{(-2\Gamma \cdot \Delta \tau)} \tag{2}$$

where $g^{(2)}$ is the second order laser light intensity fluctuation, "1" is an arbitrary baseline, β is a quality factor having a theoretical maximum of 1, Δτ is the entire sampling time structure of the correlator, and $$\tau_c = 1/\Gamma = 1/(q^2 \times D) \tag{3}$$

where $\tau_c$ is the time constant, D is the diffusion constant and q is the scattering vector, where $$q = (4\pi/\lambda)\sin(\Theta/2) \tag{4}$$

with Θ being the scattering angle and λ the wavelength of the impinging light.

The diffusion constant D relates, via the Stokes-Einstein equation, a geometrical factor, the viscosity η and the hydrodynamic radius $r_h$ to the thermal energy, which is Boltzmann's constant k multiplied by the absolute temperature T as follows:

$$D = \frac{kT}{6\pi \eta r_h} \tag{5}$$

Figure 1C:
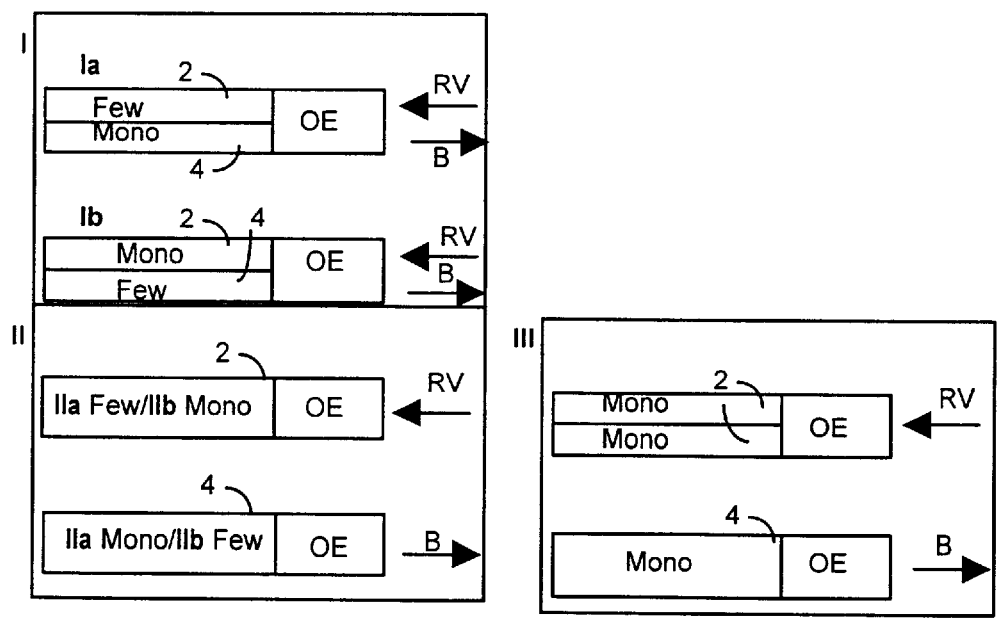
FIG. 1c depicts different arrangements of optical fibres of different types.

Under ideal conditions, the time constants $\tau_c$ are directly related to the radius $r_h$ and to the viscosity of the suspension of scattering particles. The term β (also called the intercept) is inversely proportional to the number of observed coherence areas (number of speckles) N, which fluctuate due to Brownian motion. The number of speckles is related to the number of received modes. The arrangements Ib, IIb and III of FIG. 1c provide mono-mode detection and consequently detection of a low number of speckles N. The measured ACF is formed from many different individual functions of the form of equation (2), for each of the different particle sizes. The conversion of the composite ACF shown for example in FIG. 2b to the relative amplitude intensities for different particle sizes shown in FIG. 2c may be performed by a suitable computer program such as is described in 'CONTIN: a general purpose constrained regularization program for inverting noisy linear algebraic and integral equations', Provencher, S. W., Computerphvsics Communication 27, pp. 229–242, North Holland Publishing Company, 1982.

As a result of the above relationships, DLS can be thought of as a point-like measurement technique with virtually no spatial dimension. Three dimensional (voxel) resolution requires an embodiment using a plurality of channels. The spatial mode of the received light defines N together with its inverse proportionality to the number of scattering centres in the scattering volume.

The configuration of the apparatus used in this embodiment includes a minimum of two mono-mode receiver units, in order to obtain the maximum intercept value and to enable signal processing with cross-correlation for the various polychromatic embodiments. The cross-correlation function is given by:

$$CCF(\tau) = \sum^{t} I(t)J(t+\tau) \tag{6}$$

where I(t) is the intensity measured by one receiver channel and J(t) is that measured by another receiver channel. Equation (6) is based on equation (1), but with I(t+τ) replaced by J(t+τ).

Thus, the distribution of particle radius sizes in a sample may be determined from the autocorrelation function (ACF), as shown in FIG. 2c, or from the cross-correlation function (CCF) as in equation (6).

Figure 4:
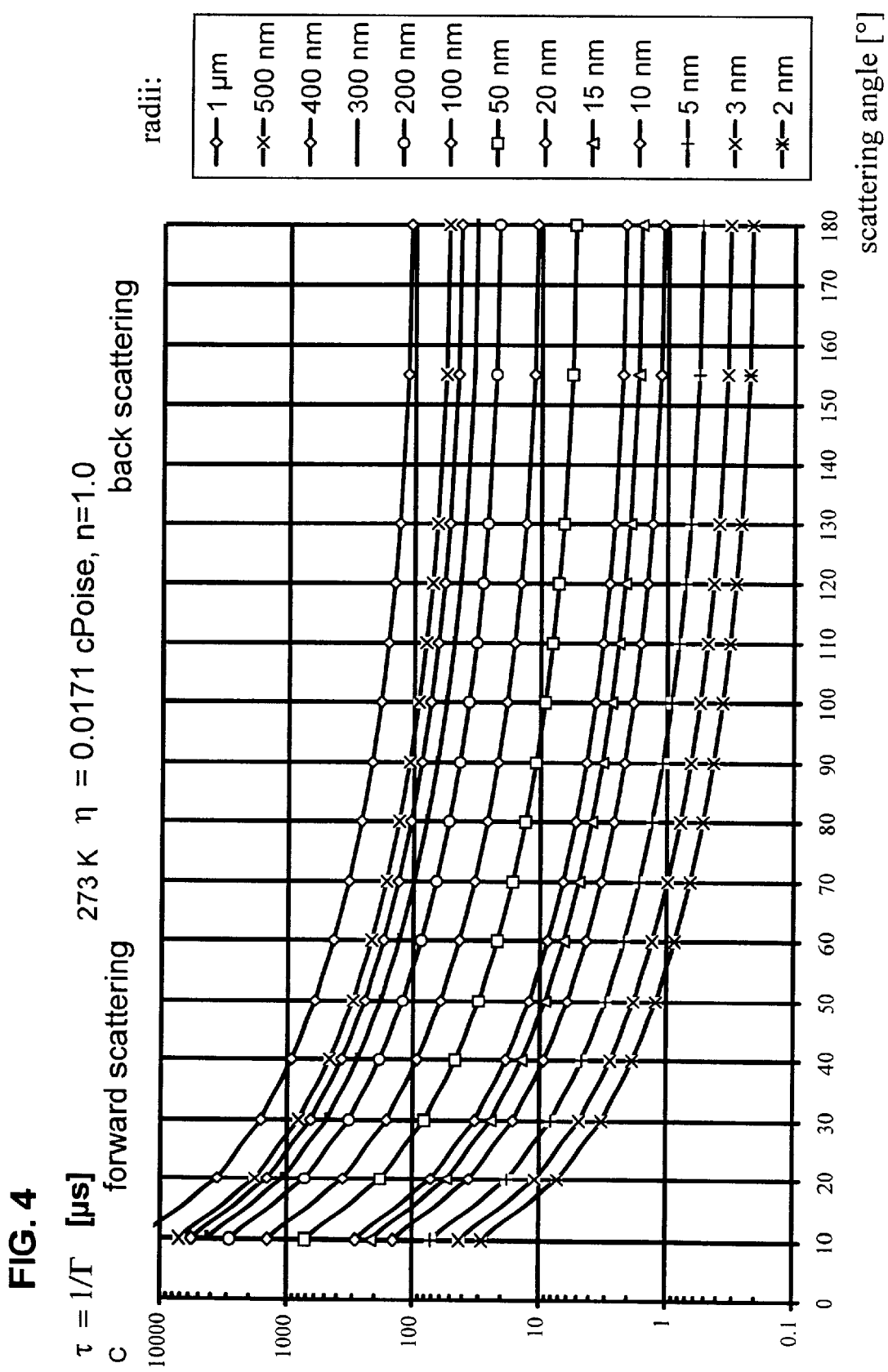
FIG. 4 shows the variation of time constants with scattering angle for different particle sizes in a sample of air, gas or atmosphere with a given viscosity and refractive index.

The relation between the decay time constant, which depends on the particle size, and scattering angle is shown in FIG. 3 for a fluid with a viscosity of $1.98 \times 10^{-3}$ Nsm$^{-2}$ (1.98 cP) and refractive index n=1.33, and in FIG. 4 for particles in air with a viscosity of $1.71 \times 10^{-5}$ Nsm$^{-2}$ (0.0171 cP) and a refractive index n=1.0.

The variation of time constants as a function of scattering angle shows that backscattering measurements at high scattering angles are preferable to scattering measurements at low scattering angles for the following reasons:

1) A 1° error in scattering angle gives a measurement error of approximately 17.2% at a scattering angle of 10°, but a measurement error of only approximately 0.2% at 170°.

2) Assuming that a measurement time of 1000 time constants $\tau_c$ is required to give a reasonably small standard deviation of about 0.3%, for a 1 μm particle a measurement time of about 5.8 minutes is required at a scattering angle of 170°, but 11.6 hours at 10°, about 120 times as long.

3) The light intensity scattered in a forward direction increases with particles above about 200 nm in size to about 10 times the backscattered intensity. The probability of getting unacceptably high count rates is therefore greater for forward scattering.

Dynamic Light Scattering may also be used to measure the velocities of particles in a fluid. In one example, the laser light is incident on a capillary tube through which fluid flows. Light is reflected from the capillary wall onto the receiver and is also scattered by the fluid. The reflected light then combines with the scattered light at the receiver to produce interference.

Flow velocities are derived from the time constant $\tau_c$ according to the following equation:

$$\Delta f = 1/(2\pi \tau_c) \tag{7}$$

The velocity component v in the direction of observation is given by:

$$v = \frac{c}{(1 - \cos(\theta))n} \Delta \frac{f}{f} \tag{8}$$

where c=velocity of light
n=refractive index
θ=observation angle relative to the velocity vector, and
f=frequency of the laser light.

Figure 5:
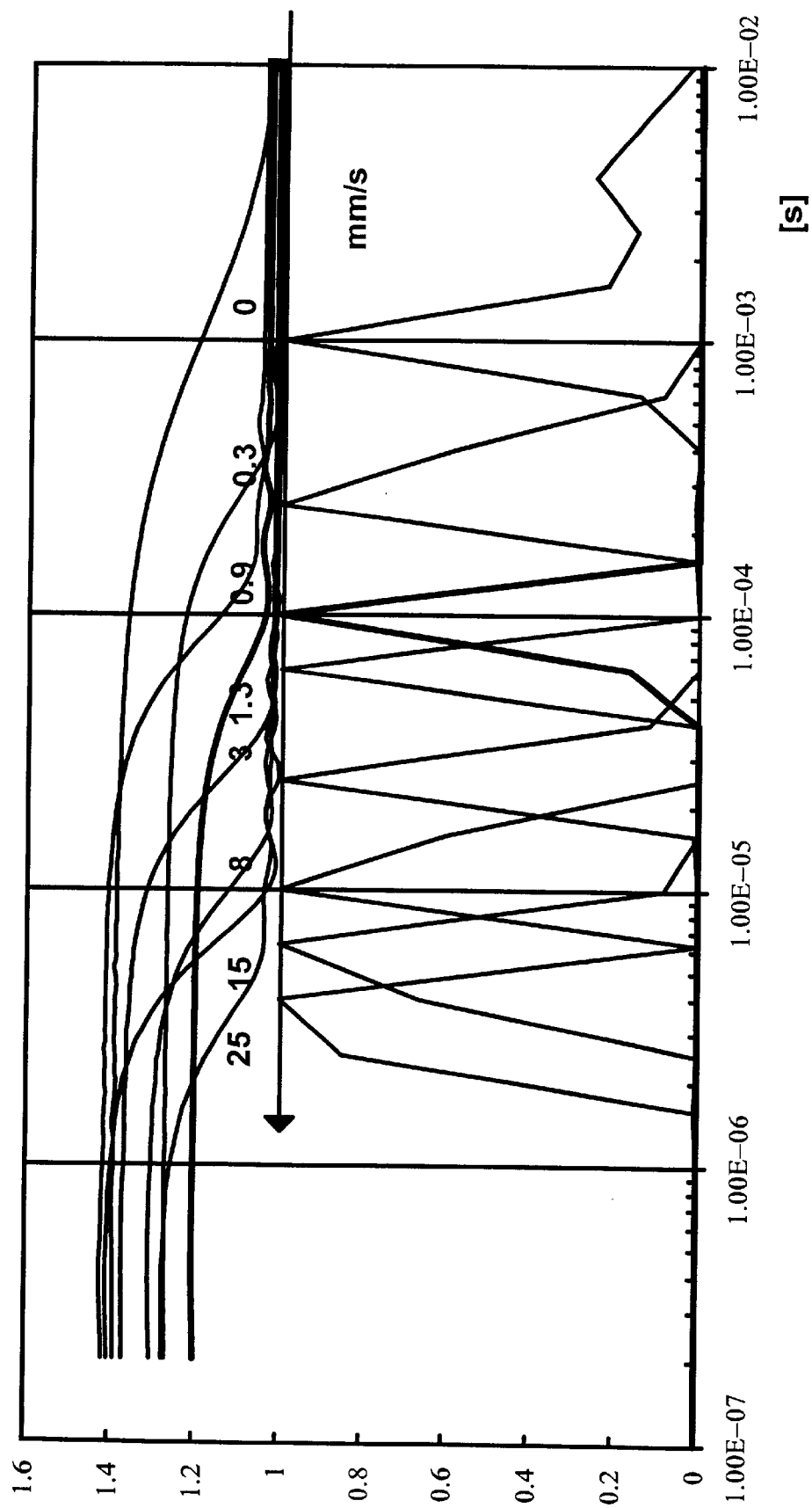
FIG. 5 shows different autocorrelation functions and bulk velocity measurements from particles in samples of fluid at different velocities.

FIG. 5 shows the ACF's and velocity profiles measured from a sample with flow rates of 0 to 25 mm/s.

For more detailed velocity measurements, the velocity profile and the extent of the measured sample need to be taken into account as indicated above in the discussion of the point-like measurement character of DLS and the advantage of scaling up systems to a multi-channel (n-fold) approach enabling the resolution of phenomena in three dimensions. The interference between the reflected and scattered light (heterodyning) can be used to resolve velocity gradients, but extracting the velocity of each of the n-fold channels simultaneously provides a complete profile acquisition on the basis of homodyning.

Figure 6:
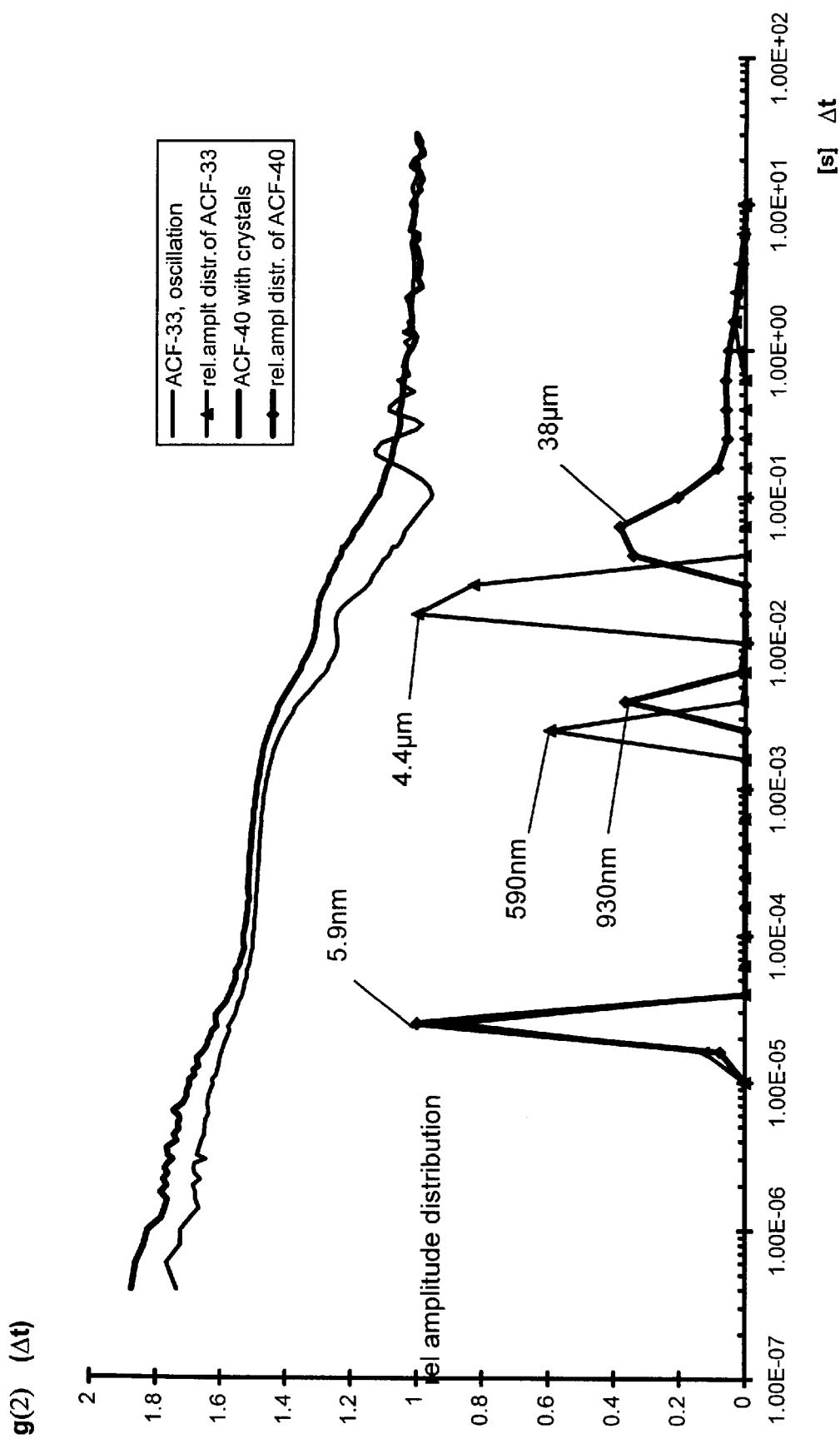
FIG. 6 shows autocorrelation functions and corresponding radius distributions from samples with contained particles having a relative velocity to each other, showing oscillations of autocorrelation functions prior to nucleation of these particles to form a crystal.

Pronounced oscillations of ACF's are detected prior to nucleation as a result of currents or velocity gradients within a suspension. FIG. 6 shows the oscillating ACF (ACF-33) close to the baseline. The time constant of oscillation is 185 ms giving a frequency of approximately 5 Hz which is used in the equation (8) as $\Delta f$, so that the velocity gradient in the volume can be determined. This oscillation is no longer present in a measurement of an ACF taken approximately 10 minutes later (ACF-40).

Under ideal DLS, with no particle interaction, light is collected from one coherence area (1×N) of the scattering volume and is analysed by autocorrelation. Using two detectors receiving scattered light from the same area reduces the effect of noise and imperfections of the detector by cross-correlating the signal from both detectors, and multiple scattering is suppressed if one coherence area is observed.

Figure 7:
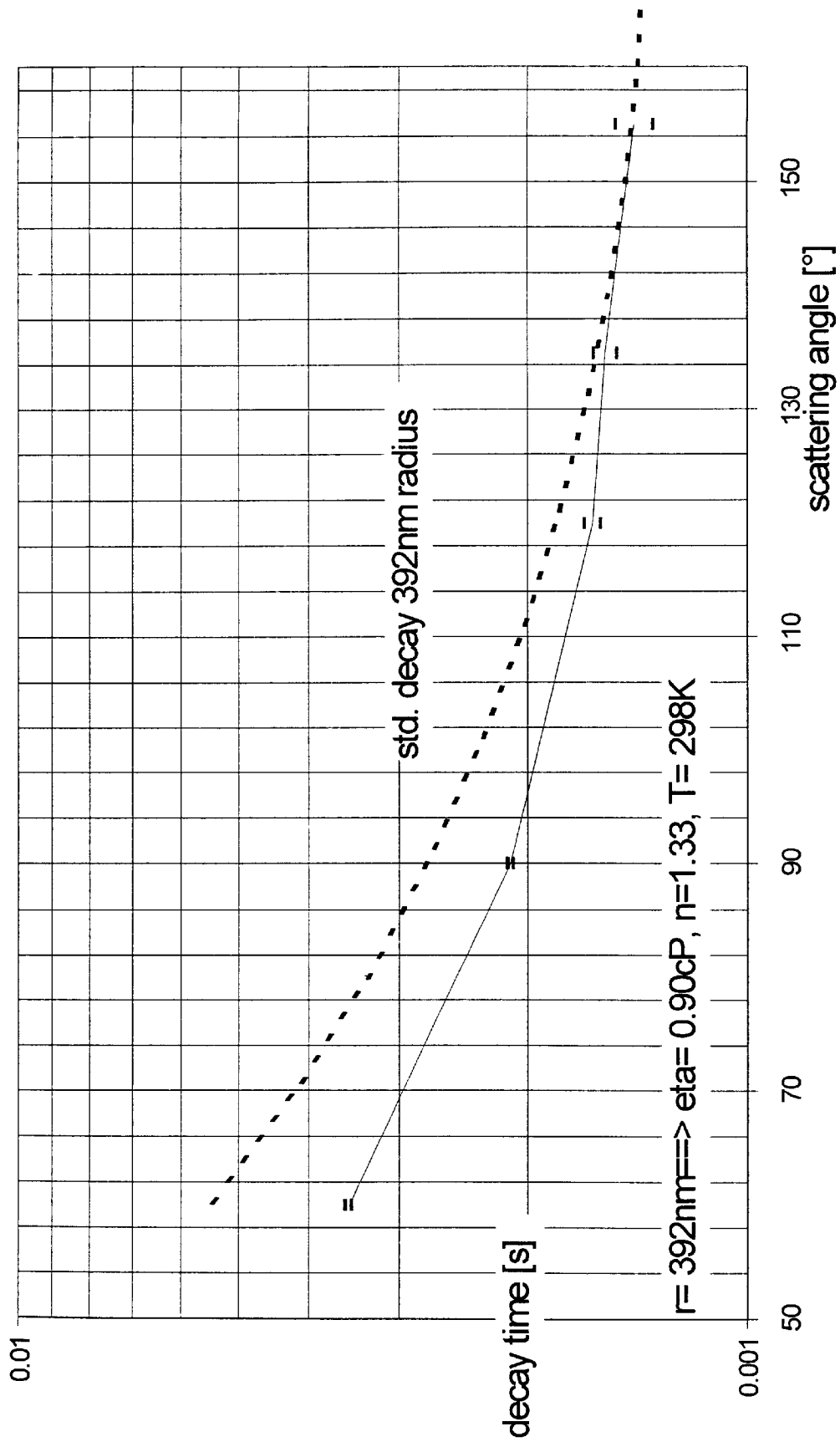
FIG. 7 shows the measured angle-dependent deviation of decay time constants from a theoretical curve as shown in FIGS. 3 and 4 with the given viscosity and refractive index.

The effect of multiple scattering and deviation from free diffusivity is determined conventionally by an angle-dependent test on a sample having a known distribution of particle sizes, using a goniometer. For example, FIG. 7 shows the measured deviation from the theoretical curve (dotted) of a sample with a particle radius of 392 nm, with viscosity of $9.0 \times 10^{-4}$ $Nsm^{-2}$ (0.90 cP).

If a measured sample includes fluorescent particles, the sample may be illuminated simultaneously with light of a number of discrete wavelengths and light corresponding to the wavelength of fluorescence is detected as described in the third mode-selecting arrangement described above. The detector includes a polychroic element to separate out the desired wavelength.

Figure 8:
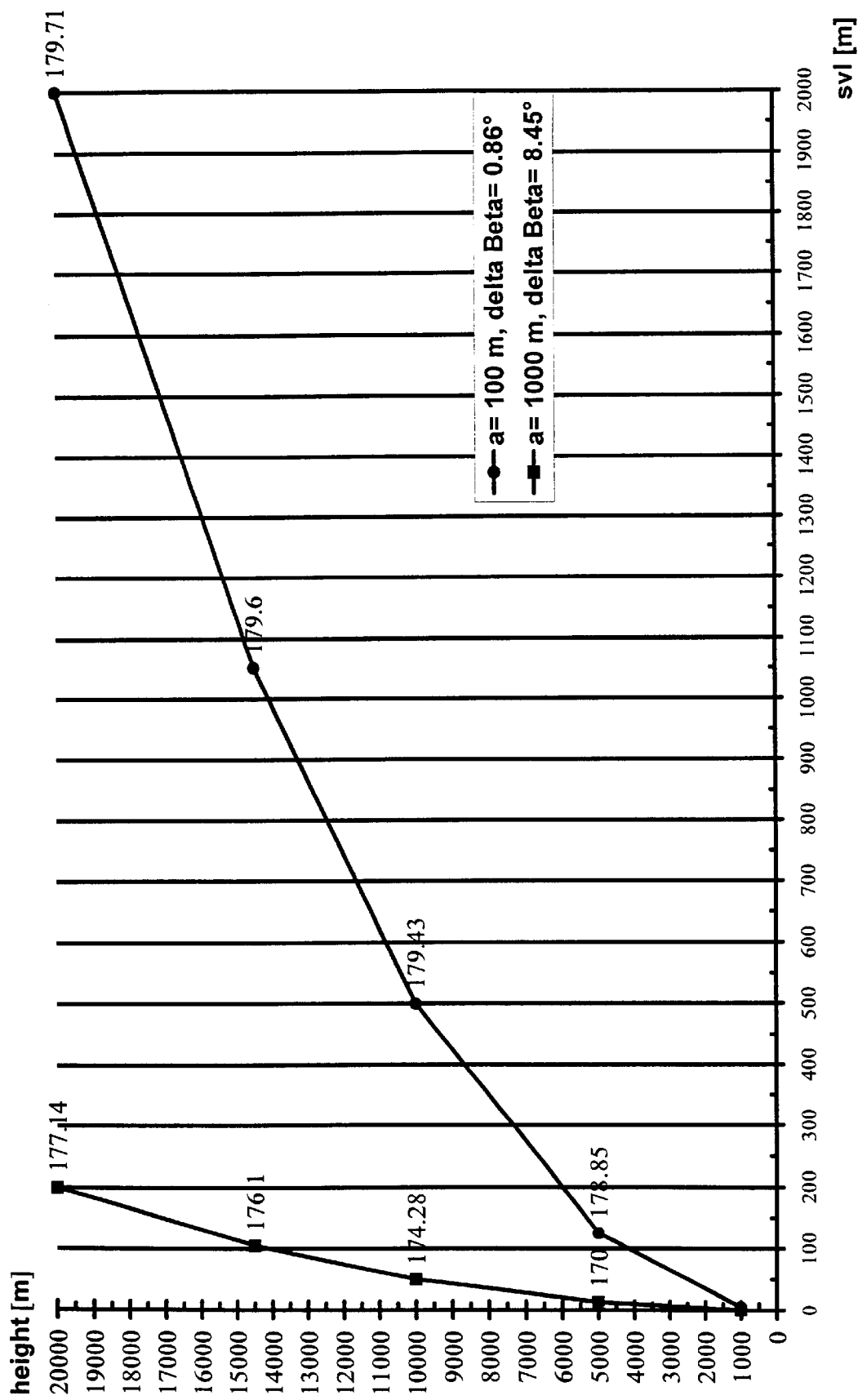
FIG. 8 shows the variation of scattering volume length with atmospheric height at different separations between transmitter and receiver.

In lidar remote-sensing applications, a portion of the atmosphere is illuminated and backscattering from that portion is detected. The scattering volume is defined by the intersection between the field of view of the transmitter and the receiver. The scattering volume length (svl) varies as a function of atmospheric height and separation $\alpha$ between the transmitter and the receiver. An example of this variation with a 0.1 mrad full angle receiver aperture is shown in FIG. 8.

As it is very difficult to observe the same portion of the atmosphere at different viewing angles, lidars are usually restricted to a single backscattering angle, which restricts the number of properties which can be measured. With pulsed illumination, backscattered light can be resolved according to time of flight. The temperature profiles in the atmosphere can be measured from elastic backscattering signals and from Raman effect return signals from nitrogen. The air viscosity can then be determined from the air temperature at the relevant height.

Figure 9:
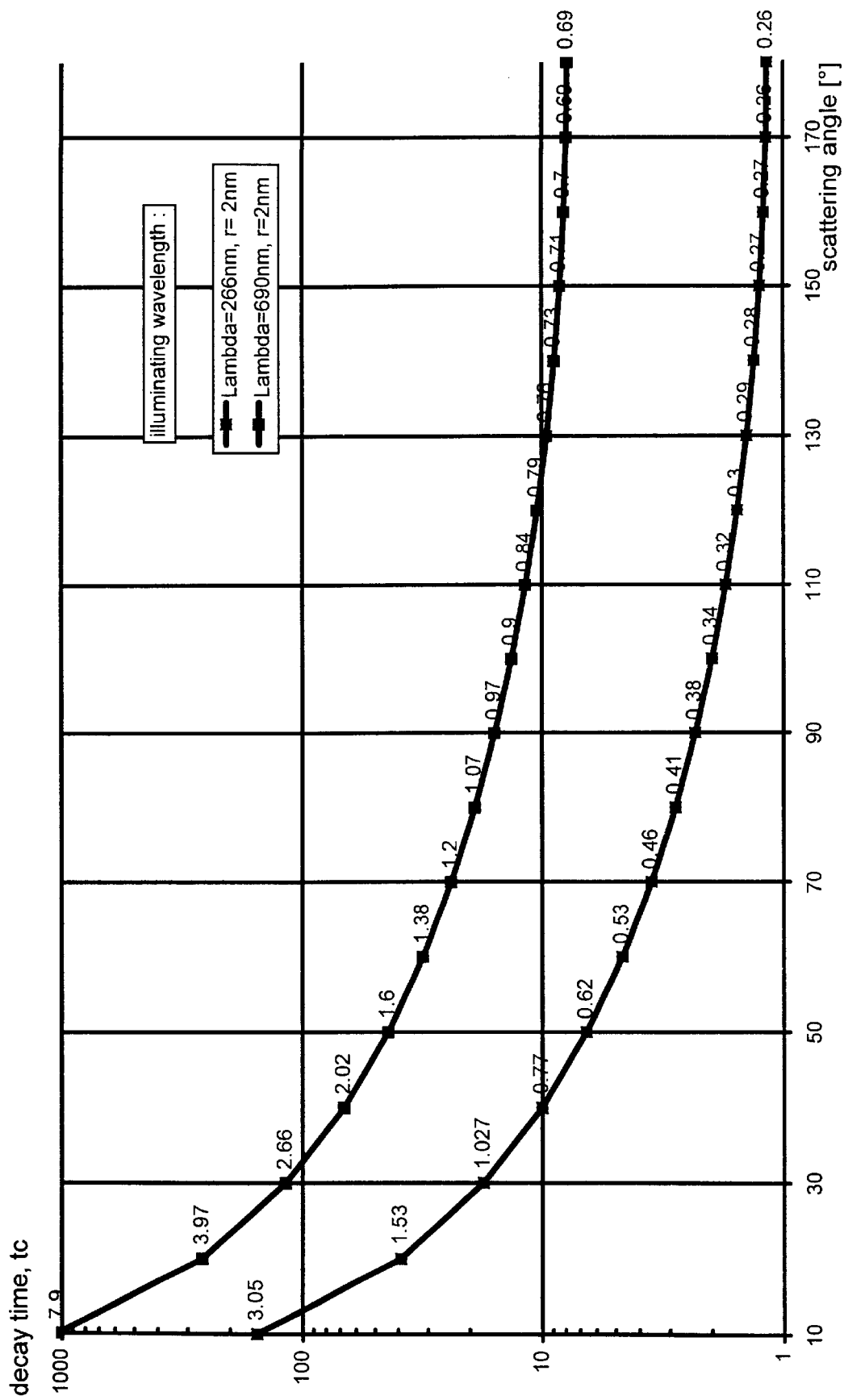
FIG. 9 shows the equivalence of time constants and wavelengths with scattering angle as calculated and normalised for two different wavelengths.

In embodiments of the present invention, in order to overcome the problems associated with angle-dependent measurements, measurements are made instead at multiple different wavelengths while the transmitter and the receiver remain in the same position. The deviation of the measured from the theoretical time constants $\tau_c$ is measured at each of the wavelengths, so as to determine the effect of multiple scattering or the degree of particle interaction which leads to a decrease in free diffusivity. FIG. 9 shows the equivalence of time constants $\tau_c$ and wavelengths as calculated and normalised for two different wavelengths of 266 nm and 690 nm. The numbers shown next to the points of the graph correspond to the equivalent wavelengths, in $\mu$m, that would produce the same time constant $\tau_c$ as the scattering angle shown on the abscissa and the actual wavelength (266 nm or 690 nm), if the equivalent wavelength were to illuminate the sample at an angle of 180° (backscattering). The scattering particle size is 2 nm.

Different embodiments of the present invention will now be described for different applications of the present invention.

Particle Size and Multiple Scattering Measurement

FIG. 10 shows an apparatus according to an embodiment of the invention, for the measurement of particle size, particle collision and multiple scattering effects in a sample. There are a plurality n of transmitters 10 and corresponding receivers 12. By means of appropriate optical elements (OE), as shown in FIGS. 1a and 1b, the scattering volumes of each transmitter/receiver channel may be superimposed so that the measurements of each channel are made on the same scattering volume, or the scattering volumes of the channels may be arranged in an array, so as to provide two or three dimensional resolution of the measured properties.

Each transmitter 10 comprises one or more lasers 11 each coupled to a respective mono-mode fibre 4, for transmitting a single wavelength $\lambda_1, \lambda_2, \lambda_3$ . . . Each receiver 12 comprises a plurality of mono-mode fibres, each having a corresponding detector and discriminator, as in arrangement III described with reference to FIG. 1c. The mono-mode fibres may be selected to transmit respective different wavelengths or some of the fibres may transmit the same wavelength.

The detectors for each receiver 12 are shown collectively as reference 14 in FIG. 10, while the discriminators are shown collectively by reference 16 and the pulse formers by reference 18. For each channel 1 to n, there is a correlator 20a to 20n which auto-correlates the signal from one detector, or cross-correlates the signals from two or more different detectors of light of the same wavelength. The outputs of the cross-correlators, in the form of cross-correlation functions CCF as derived in equation (6) above are input to a processor 22. In a typical implementation, the discriminators 16, pulse formers 18 and correlators 20 are provided by a dedicated card installed in a general purpose computer which is represented by the processor 30.

Figure 11:
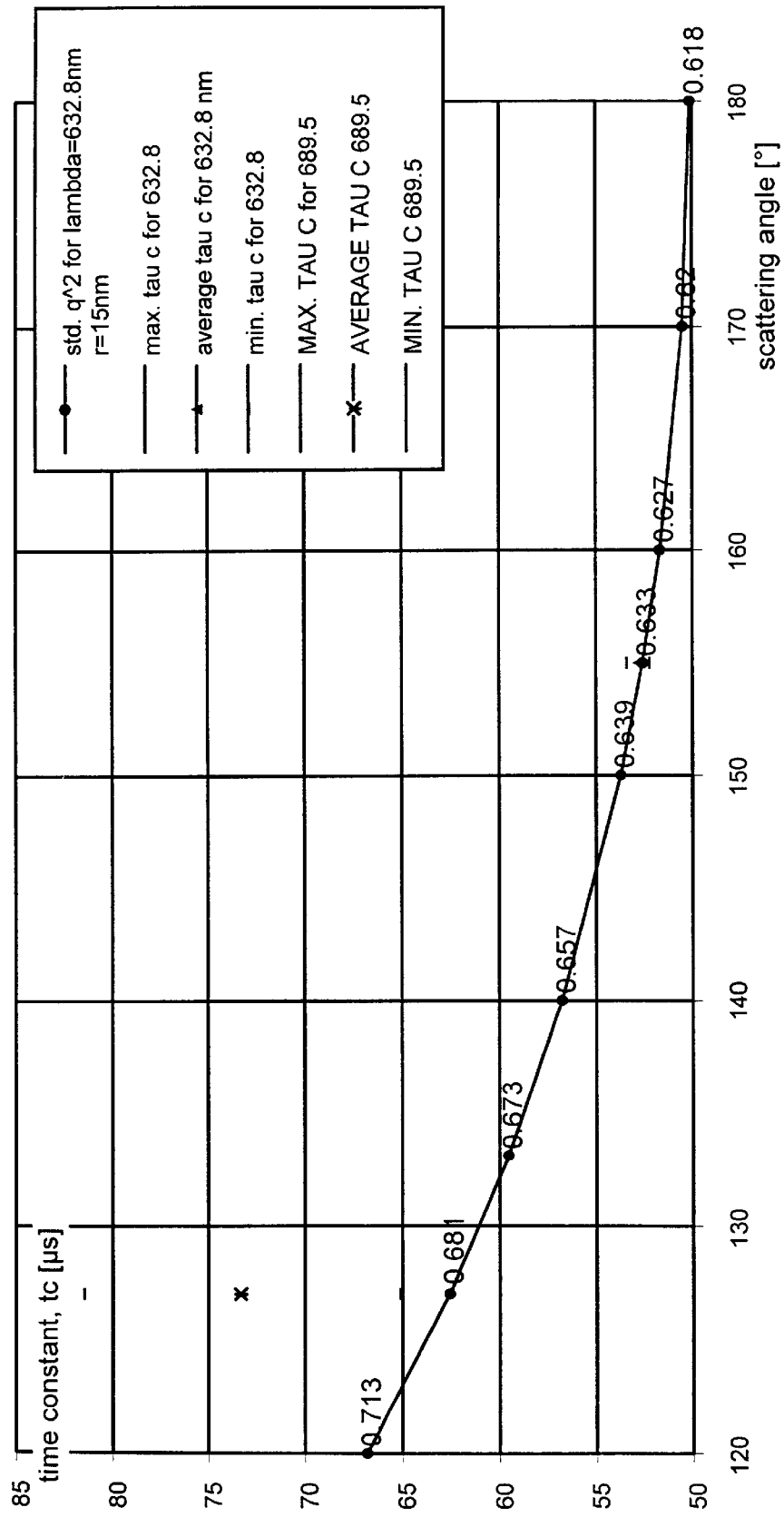
FIG. 11 shows the measured values of time constants for two different wavelengths.

The apparatus shown in FIG. 10 allows measurements of the time constant $\tau_c$ at multiple wavelengths simultaneously from the same sample. In the example shown in FIG. 11, measurements of the time constant $\tau_c$ for particles of radius 15 nm are shown for wavelengths of 632.8 nm and 689.5 nm, with their equivalent scattering angles normalised and calculated for a beam of 618 nm impinging at 180°. Four measurements are made for each wavelength and the maximum, minimum and average measurements being shown. The large systematic error for measurements at 632.8 nm are due to temperature control instabilities in the laser diode used for that wavelength, leading to limited coherence lengths or spectral purities. The measurements are shown in FIG. 11 on a graph of time constant $\tau_c$ against scattering angle to show that the equivalencies exist and the sample has the ideal properties within the standard deviation for these tests. The equivalence is calculated by combining equations (3) and (4) and normalising this to an assumed wavelength impinging at 180°.

The array arrangement allows for particle sizing as a function of extended length in a cuvette or a micro-vial plate. To ensure test reproducibility and the homogeneity of the sample, control of sample properties is provided by the quasi-simultaneous sampling of one scattering volume.

Figure 10A:
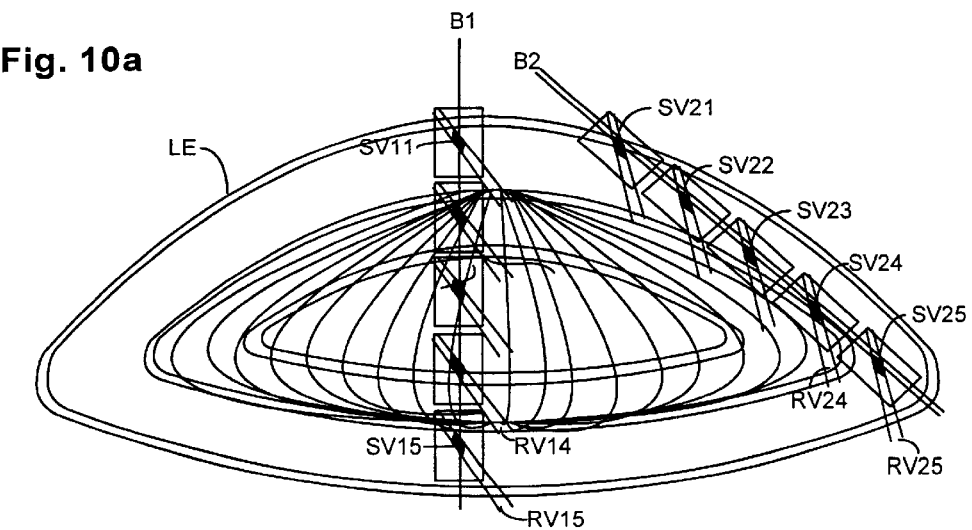
FIG. 10a shows beam tracings in an implementation of the embodiment of FIG. 10.

FIG. 10a shows an example of an implementation in which multiple sampling volumes are defined in the lens LE of an eye. The front of the lens LE is positioned in upper part of FIG. 10a, and the scattering apparatus is positioned in front of the lens, so as to measure scattering particle size at different parts of the lens in situ. A first approximately parallel beam B1 and a second approximately parallel beam B2 generated by first and second transmitters 10a, 10b (not shown in this Figure) are incident along the lens axis and approximately parallel to the lens surface respectively. Each beam may contain one or more discrete wavelengths generated by different lasers. For each beam B1, B2 there are five receivers 12a to 12e which receive scattered light from respective reception volumes RV11–RV15, RV21–RV25 which intersect the beams B1, B2 to define scattering volumes SV11–SV15, SV21–SV25 respectively for measuring particle size at different parts of the lens LE. A similar arrangement of intersecting beams B and detected volumes V can be used to measure particle size across a micro-vial plate.

Depolarised Cross-correlation DLS

While the translational diffusion velocity is proportional to the particle radius r, the rotational diffusion velocity is proportional to $r^3$ and is therefore more sensitive to small changes in size. Moreover, by comparison of rotational and translational diffusion velocities, information on particle shape can be obtained. Rotational velocity can be derived from the depolarised component of scattered light.

Figure 10B:
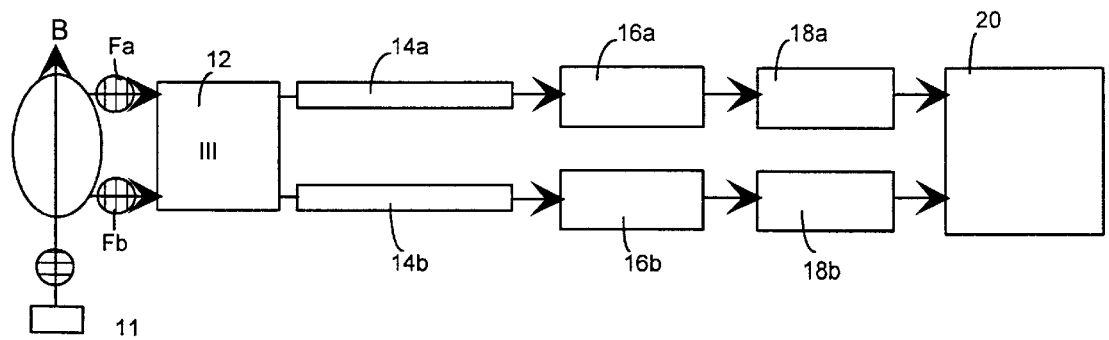
FIG. 10b shows an implementation of the embodiment of FIG. 10 for measuring the depolarised cross-correlation DLS.

FIG. 10b shows apparatus for depolarised cross-correlation DLS measurement. A laser 11 generates a beam having vertical polarisation which illuminates a sampling volume SV and the scattered light from the sampling volume SV is received by a receiver 12 having at least two mono-mode fibres 2 through respective parallel horizontal polarizing filters Fa, Fb. As in the arrangement III described with reference to FIGS. 1a and 1b, each fibre 2 is coupled to a detector 14, discriminator 16 and pulse former 18, and the different outputs are correlated by a cross-correlator 20, as described with reference to FIG. 10. The complementary adjustment of the polarization direction of the laser 11 compared to the polarizing filters F removes system noise by cross-correlating the two signals. Thus, very subtle changes in signal strength and in the count rate of the depolarized component can be resolved. The depolarized component is used to calculate the time constant of rotational diffusion of the particles, which is proportional to $r^3$ whereas the transitional diffusion time constant is proportional to $r^2$, as shown by equations (3) and (5).

Fluorescence Measurement

In this embodiment, the apparatus as shown in FIG. 10 is combined with the design of FIG. 10b used with a fluorescent sample. The maximal contrast of the intensity fluctuation is observed, if the scattering volume is very small (e.g. $4 \times 4 \times 4$ $\mu m^3$), although the fluorescent light is inelastic and incoherent. The movement of the particle through such a limited volume produces a quasi-stochastic signal, which can be correlated and eventually yields a time constant. If the particle is linked to a marker, this acquired time constant relates to kinetics or diffusion conditions prevailing in the sample for the particles linked to the marker. Alternatively, if the sample is illuminated with a plurality of lasers of different wavelengths, auto-fluorescence may occur and no marker is therefore needed. By the use of polarizing filters, as shown in FIG. 10b, detection of the impinging laser beam is suppressed and the signal strength of the fluorescent light is improved.

Active Remote Sensing

Figure 12A:
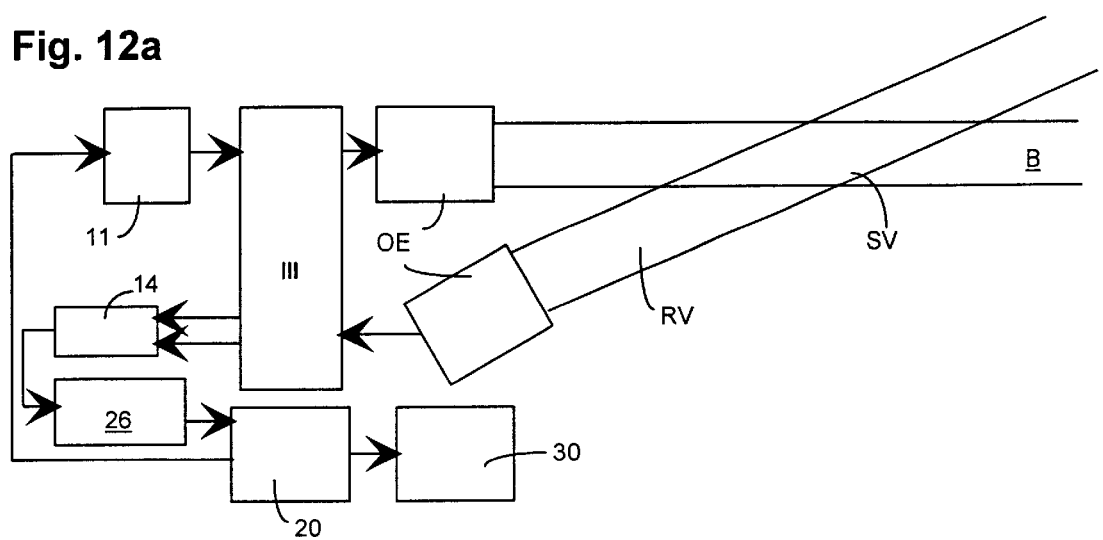
FIGS. 12a and 12b shows two alternative embodiments for active remote sensing of the atmosphere.
Figure 12B:
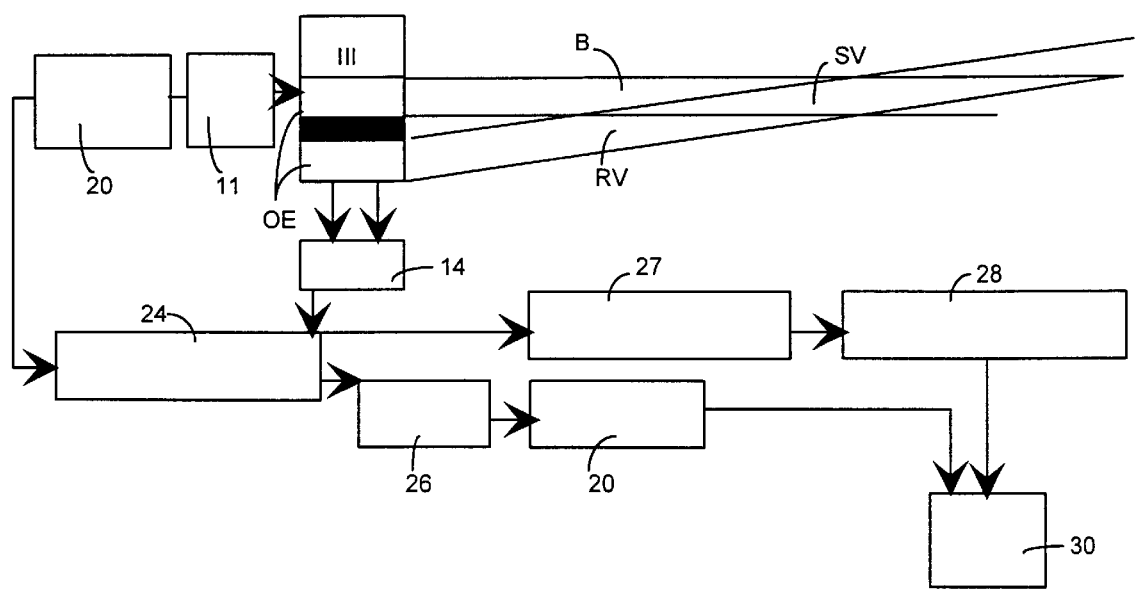

FIGS. 12a and 12b show two alternative embodiments for polychromatic active remote sensing of the atmosphere. These embodiments represent opposite extremes of design, in which the distance between transmitter and receiver is respectively either very large and the scattering volume very short as in FIG. 12a, or the distance is not very large and the scattering volume very long as in FIG. 12b. For both embodiments, the signal processing apparatus is as shown in FIGS. 13a to f.

In both embodiments, pulsed lasers 11 of respective different wavelengths are used to generate the illuminating beam. The lasers 11 are either triggered by a pulse generator 22, or synchronised with the sampling timing of the correlator 20. In the embodiment shown in FIG. 12b, a time-of-flight register 24 measures the time between the pulsing of the laser 11 and the received scattered pulse and thereby calculates the time of flight. The received pulse intensity from each of the detectors is input to a multi-channel integrator 27 which combines the intensity as received from each detector 14 and passes this to a store 28 which stores the intensity as a function of time. This function is passed to the processor 30 which performs evaluation of the lidar data in the conventional manner, to calculate scattering intensity as a function of height.

Figure 13:
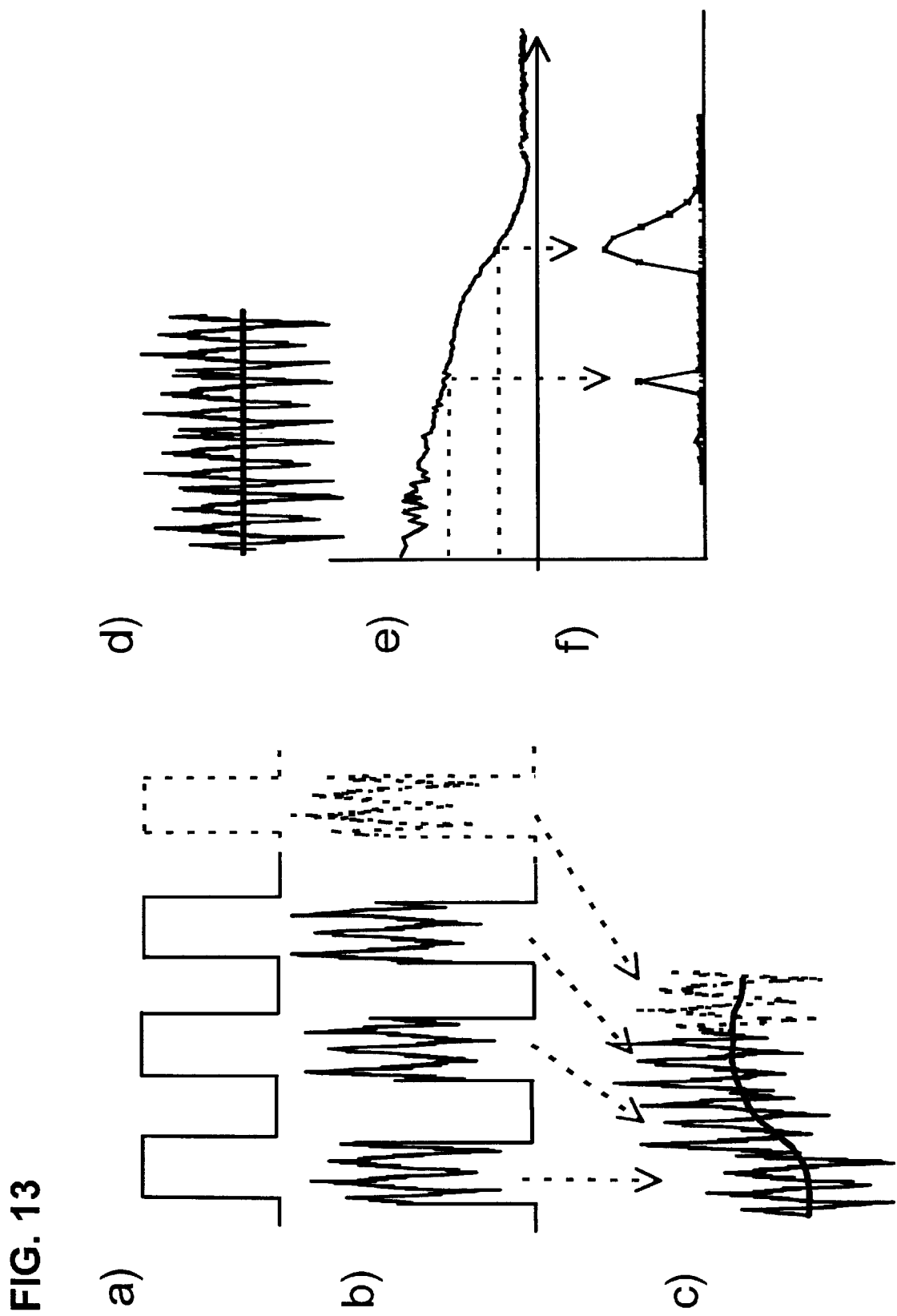
FIGS. 13a to 13f show the signal processing steps for measuring particle radius distribution in the embodiments of FIGS. 12a and 12b.

Both the embodiments have a receiver comprising a plurality of mono-mode fibres 4, as in the arrangement III shown in FIGS. 1a and 1b, and detectors 14. FIG. 13a shows the waveform of one of the pulsed lasers 11, while FIG. 13b shows the received intensity signal as measured by one of the detectors 14. The received signal is processed by removing the intervals between the received signal pulses to give a concatenated signal as shown in FIG. 13c. The concatenated signal is then digitally high-pass filtered by filter 26 to give the waveform shown in FIG. 13d. The filtering removes the effect of fluctuation of the number of scattering particles in the scattering volume. The resultant signal is then cross-correlated to give the CCF shown in FIG. 13e, from which the radius distribution as shown in FIG. 13f is derived by the method described above. In the embodiment shown in FIG. 12b, the auto-correlation function is calculated as a function of atmospheric height.

In both FIGS. 12a and 12b, the optical equipment OE comprises a telescope defining the transmitted beam B and a separate telescope defining the receiving volume RV.

In one example, one of the lasers is a continuous wave 1 W NdYAG laser emitting light at 532 nm is used to illuminate a scattering volume as given in FIG. 8 at a height of 10000 m and a transmitter-receiver distance of 1000 m.

Applications

The above embodiments, particularly the configurations of the electronics and the receiver fibres, can be used for many different applications, as described below.

The apparatus shown in FIG. 8 may be used both for laboratory-based studies, such as aerosol or combustion study, and for reduced gravity environment studies, such as may be carried out on spacecraft. As the apparatus can be miniaturized, it is particularly suitable for a spacecraft payload. Possible microgravity applications include spectroscopy on complex chemical systems, fibre protein aggregations, kinetic studies and nucleation onset together with the study of early crystal growth. For a given payload size, the apparatus allows a higher density of devices; this is particularly important for a Protein Crystallization Diagnostics Facility.

The apparatus could also be applied to most types of ground-based lidar for the determination of multiple scattering or sizing of particles, or performance of PCS or FCS on droplets or scattering centres, or determination of viscoelastic properties.

The apparatus is particularly useful for applications in ophthalmology, where it is difficult to obtain angle-dependent measurements under in vivo conditions. For example, the mechanisms leading to opacification of the eye lens and the changes in the vitreous body as a function of age may be measured.

Fluorescence measurements could be used to measure subtle chemical gradients in the micro-environment of biological systems. The apparatus for wavelength dependent particle sizing may be used without modification for fluorescent samples. The separation of detected fluorescent light may be accomplished using known specific aperture filters combined with the new arrangements shown in the third arrangement of FIGS. 1a and 1b. This may be used to achieve even lower detection thresholds, as described for example in 'Fluorescence Correlation, Single Molecule Detection and Large Number Screening Application in Biotechnology', Rudolf Rigler, Journal of Biotechnology 41, pp. 177–186 (1995)., without any sample manipulation or added markers.

The lidars shown in FIGS. 12a and 12b could be installed on two satellites, with the transmitter on one, and the receiver on the other or the transmitter could be located on a satellite with the receiver on the ground.

In the atmospheric sensing application, the effect of multiple scattering, the limitation on diffusion by particle collision and the velocity components of particles in clouds can be differentiated. This could be used for example to determine the horizontal displacement of a cloud of pollutants in atmospheric boundary layers, by determining the vertical profile of velocity vectors. The embodiment can be used to measure properties of aerosols in the atmosphere, such as particle or droplet size, and tracking of pollution especially in regions of high aerosol loading. The determination of particle sizes in the troposphere is particularly important, as ozone depletion is thought to be linked to the nature of particles in tropospheric clouds ('Unexpected Low Ozone Concentration in Midlatitude Tropospheric Ice Clouds: A Case Study', J. Reichardt et. al., Geophysical Research Letters, Vol. 23, No. 15, pp. 1929–1932, Jul. 15, 1996).

The active remote sensing embodiment of the present invention may be used to determine in situ the pressure and temperature dependency of condensation of atmospheric water vapour. The measurement of smallest particle sizes as a function of atmospheric height may be used to estimate water vapour cross-sections, for which the published data are in considerable disagreement. The application to atmospheric measurements allows the measurement of the wavelength dependency of scattering by ice-crystals or droplets in optically thick layers. Dutch patent no. 1001369 describes how DLS or PCS test results may be applied to data derived from low concentrations of particles suspended in air as aerosols.

Embodiments of the present invention allow a correction factor to be determined between multiple scattering, the scattering coefficient and the diameter adjustment of the field of view. The correction factor is determined by calculating the separation between the theoretical curve and the measured curve for the sample under observation, as shown for example in FIG. 7.

For example, if multiple scattering occurs, the derived ACF will not be plotted as a function of intercept and sampling time structure of the correlator, but as a function of the square root of time. This is called diffusive wave spectroscopy, as described in Chapter 16, 'Diffusing Wave Spectroscopy' by David A. Weitz and David J. Pine of the book 'Dynamic Light Scattering—The Method and Some Applications' edited by Wyn Brown, Clarendon Press 1993, and could be applied to the above embodiments in real time.

What is claimed is:

1. A dynamic light scattering method, comprising:
    illuminating a fluid scattering volume with temporally and spatially coherent radiation at a plurality of discrete wavelengths,
    detecting the fluctuation of radiation scattered by said fluid volume of each of said wavelengths, and
    correlating the detected intensity at each of said wavelengths as a function of time so as to derive a property of scattering centres in said fluid scattering volume by normalising the respective results obtained from the correlation for each of said wavelengths to equivalent respective scattering angles.

2. A method as claimed in claim 1, wherein the fluid scattering volume is simultaneously illuminated with each of said plurality of discrete wavelengths.

3. A method as claimed in claim 1, wherein each of said wavelengths is detected at substantially the same scattering angle.

4. A method as claimed in claim 1, wherein the scattered radiation is received by an optical arrangement including a mode-selective transmission medium prior to detection.

5. A method as claimed in claim 4, wherein the scattered radiation is received by a plurality of mono-mode optical fibres each coupled to a respective receiver for detecting the radiation received by that fibre.

6. A method as claimed in claim 5, wherein the intensity fluctuation of the scattered radiation of one or more of said wavelengths is received by at least one pair of said receivers corresponding to each of said one or more wavelengths and the outputs of each said pair are cross-correlated.

7. A method as claimed in claim 1, wherein the steps of illuminating and detecting are performed substantially simultaneously with a plurality of scattering volumes.

8. Dynamic light scattering apparatus, comprising:
    a radiation source arranged to illuminate a fluid scattering volume with temporally and spatially coherent radiation at a plurality of discrete wavelengths, and
    a detector arranged to detect the intensity fluctuation of each of said wavelengths of said radiation scattered by said fluid volume, to correlate the detected intensity of each of said wavelengths as a function of time and to normalise the respective results obtained from the correlation for each of said wavelengths to respective scattering angles so as to derive a property of scattering centres in said fluid scattering volume.

9. Dynamic light scattering apparatus, comprising:
    a radiation source arranged to illuminate a fluid scattering volume with temporally and spatially coherent radiation, and
    a detector arranged to detect the fluctuation of said radiation scattered by said fluid volume, comprising a plurality of mono-mode fibres each arranged to detect said radiation at approximately the same scattering angle and each coupled to a respective radiation detecting element.

10. Apparatus as claimed in claim 9, wherein the radiation source includes one or more lasers each coupled to a respective one or more mono-mode fibre.

11. Apparatus as claimed in claim 9, wherein the radiation source transmits said radiation through, and the detector receives said scattered radiation through, respective different optical elements.

12. Apparatus as claimed in claim 9, including a cross-correlator for cross-correlating as a function of time the outputs of at least two of said radiation detecting elements receiving said scattered radiation at the same wavelength.

13. Apparatus as claimed in claim 9, wherein said illuminating radiation is polarized, and the detector includes a polarizer so as to detect a depolarized component of said scattered radiation.

14. A method of detecting the velocity of scattering centres in a fluid scattering volume by means of dynamic light scattering, comprising:

illuminating the fluid scattering volume with temporally coherent radiation of a discrete wavelength, detecting the fluctuation of radiation scattered by said fluid volume, correlating the detected intensity as a function of time to generate a correlation function;

determining one or more oscillation frequencies of components of said correlation function; and deriving velocity components of scattering particles in said fluid volume from said one or more oscillation frequencies.

15. A method as claimed in claim 14, wherein the velocity components are derived by means of the relation $$v_\theta = \frac{c}{n} \frac{\Delta f}{f}$$

where $v_\theta$ is the velocity component is the direction of detection, $\Delta f$ is the oscillation frequency, f is the frequency of the radiation, n is the refractive index of the fluid volume, and c is the speed of light.

16. A dynamic light scattering method, comprising:

illuminating a fluid scattering volume with temporally and spatially coherent radiation at a plurality of discrete wavelengths along substantially the same illumination axis, detecting the fluctuation of radiation scattered by said fluid volume of each of said wavelengths along substantially the same detection axis, and correlating the detected intensity at each of said wavelengths as a function of time so as to derive a property of scattering centres in said fluid scattering volume.

17. Dynamic light scattering apparatus, comprising:

a radiation source arranged to illuminate a fluid scattering volume with temporally and spatially coherent radiation at a plurality of discrete wavelengths along substantially the same illumination axis, and a detector arranged to detect the intensity fluctuation of each of said wavelengths of said radiation scattered by said fluid volume along substantially the same detection axis, and to correlate the detected intensity of each of said wavelengths as a function of time so as to derive a property of scattering centres in said fluid scattering volume.

* * * * *